United States Patent [19]

Ciampa

[11] Patent Number: 5,247,356
[45] Date of Patent: Sep. 21, 1993

[54] METHOD AND APPARATUS FOR MAPPING AND MEASURING LAND

[76] Inventor: John A. Ciampa, 1894 Strong Rd., Victor, N.Y. 14564

[21] Appl. No.: 836,880

[22] Filed: Feb. 14, 1992

[51] Int. Cl.⁵ .............................................. H04N 7/18
[52] U.S. Cl. ..................................... 358/109; 358/107
[58] Field of Search ....................... 358/83, 109, 107; 33/1 A

[56] References Cited

U.S. PATENT DOCUMENTS

| | | |
|---|---|---|
| 3,594,556 | 7/1971 | Edwards . |
| 3,725,563 | 4/1973 | Woycechowsky . |
| 3,864,513 | 2/1975 | Halajian . |
| 4,015,080 | 3/1977 | Moore-Searson . |
| 4,240,108 | 12/1980 | Levy . |
| 4,360,876 | 11/1982 | Girault . |
| 4,463,380 | 7/1984 | Hooks, Jr. . |
| 4,543,603 | 9/1985 | Laures .............................. 358/109 |
| 4,635,136 | 1/1987 | Ciampa . |
| 4,686,474 | 8/1987 | Olsen . |
| 4,688,092 | 8/1987 | Kamel . |
| 4,707,698 | 11/1987 | Constant . |
| 4,814,711 | 3/1989 | Olsen . |
| 4,814,896 | 3/1989 | Heitzman . |
| 5,034,812 | 7/1991 | Rawlings . |

*Primary Examiner*—Tommy P. Chin
*Assistant Examiner*—Richard Lee
*Attorney, Agent, or Firm*—Nixon, Hargrave, Devans & Doyle

[57] ABSTRACT

A method and apparatus for mapping land can create overlapping images of portions of a strip of land, assign to those images geographic coordinates calculated in real time from initially stored coordinates of a first predetermined templated image, such that a series of images can be accessed from a storage medium to be displayed as a video map of the strip of land without manually assigning geographic coordinates to it. The method and apparatus can also be used to electronically measure the portions of the strip of land, and determine the geographic elevation of points on the strip of land.

16 Claims, 7 Drawing Sheets

METHOD AND APPARATUS FOR MAPPING AND MEASURING LAND

FIELD OF THE INVENTION

The present invention relates to a method and apparatus for mapping and measuring land, and more particularly, to a method and apparatus for generating electronic, overlapping images of portions of land, calculating on the fly geographic coordinates associated with those portions and storing in real time the images and coordinates in a randomly accessible storage medium.

BACKGROUND OF THE INVENTION

Traditional electronic mapping techniques employ the largely manual, multi-step transfer of spatial data, such as geographic coordinates, from tax maps or other legal maps to digital or photographic representations of geographic locations. Such manual transfer is vulnerable to human error, costly, time consuming, and may result in erroneous maps that are infrequently updated and likely to be stale. Further, traditional methods of mapping involve capturing images of land from an angle orthogonal to the surface of the land. This, however, can be disorienting in that it does not afford recognition or match up with prior live visual memories of the area taken in by the eye, which are nearly always from oblique angles. While there are current systems which provide stores of oblique video images, they are coordinated with manually compiled spatial data such as addresses or coordinates wiped over or overlaid onto the video in a pre or post production stage conducted after the creation of the images. For example, see U.S. Pat. No. 4,635,136, issued Jan. 6, 1987 to Ciampa.

It is a principal object of this invention to provide a mapping and land measurement method and apparatus which can create a digital video image of a portion of land from an analog or digital source, store it in memory, create a data word describing the geographic coordinates of the four corners of the image, and imbed the data word in one horizontal video line of the image.

It is another principal object of this invention to provide a method and apparatus for measuring land by accurately scaling the video image of the land.

It is another principal object of this invention to provide a method and apparatus for determining the elevation of a point on the land.

SUMMARY OF THE INVENTION

Briefly described, a mapping and land measurement method and apparatus embodying the present invention involves creating first, second and subsequent, sequential overlapping analog or digital video images depicting portions of a continuous strip of land, wherein a stationary object depicted in a unique portion of the image, reflected in the unique chrominance and/or luminance digital codes representing the object, is located in the leading edge of the first image of an image set. Coordinates of the corners of the first image are determined, as is the stationary object's position with respect to the corners of the first image. The object's position with respect to the corners of the second and subsequent images in the set of images which contains the object is calculated in an X-Y coordinate system by a computer with digital image processing capabilities, by adjusting the four corner coordinates of the first image by an amount proportional to the scaled distance and direction of a line drawn between the object's first, second and subsequent positions in the X-Y coordinate system superimposed on the digital image. The corner coordinates of the first image are electronically stored in the first image to create a first coordinated image, and the first coordinated image is then stored in computer memory. Similarly, the calculated coordinates are stored in the second image and the resulting second coordinated image is stored in computer memory. For each image, a data word describing the coordinates is stored in unused lines of analog video frames or the digital image file of the first or second images, respectively. In a preferred embodiment of the invention, geographic information obtained from other sources is written into the common memory location. Land is measured by calculating the distance between points within the scaled image of that land in the manner described above for calculating distance between the changed position of the stationary object in the image set. Elevation of a point on a portion of the imaged land is determined trigonometrically by the computer, based upon altimeter and rangefinder inputs.

BRIEF DESCRIPTION OF THE DRAWINGS

The foregoing and other objects, features and advantages of the invention, as well as a presently preferred embodiment thereof, will become more apparent from a reading of the following description in connection with the accompanying drawings in which.

DETAILED DESCRIPTION OF THE INVENTION

Figure 1:
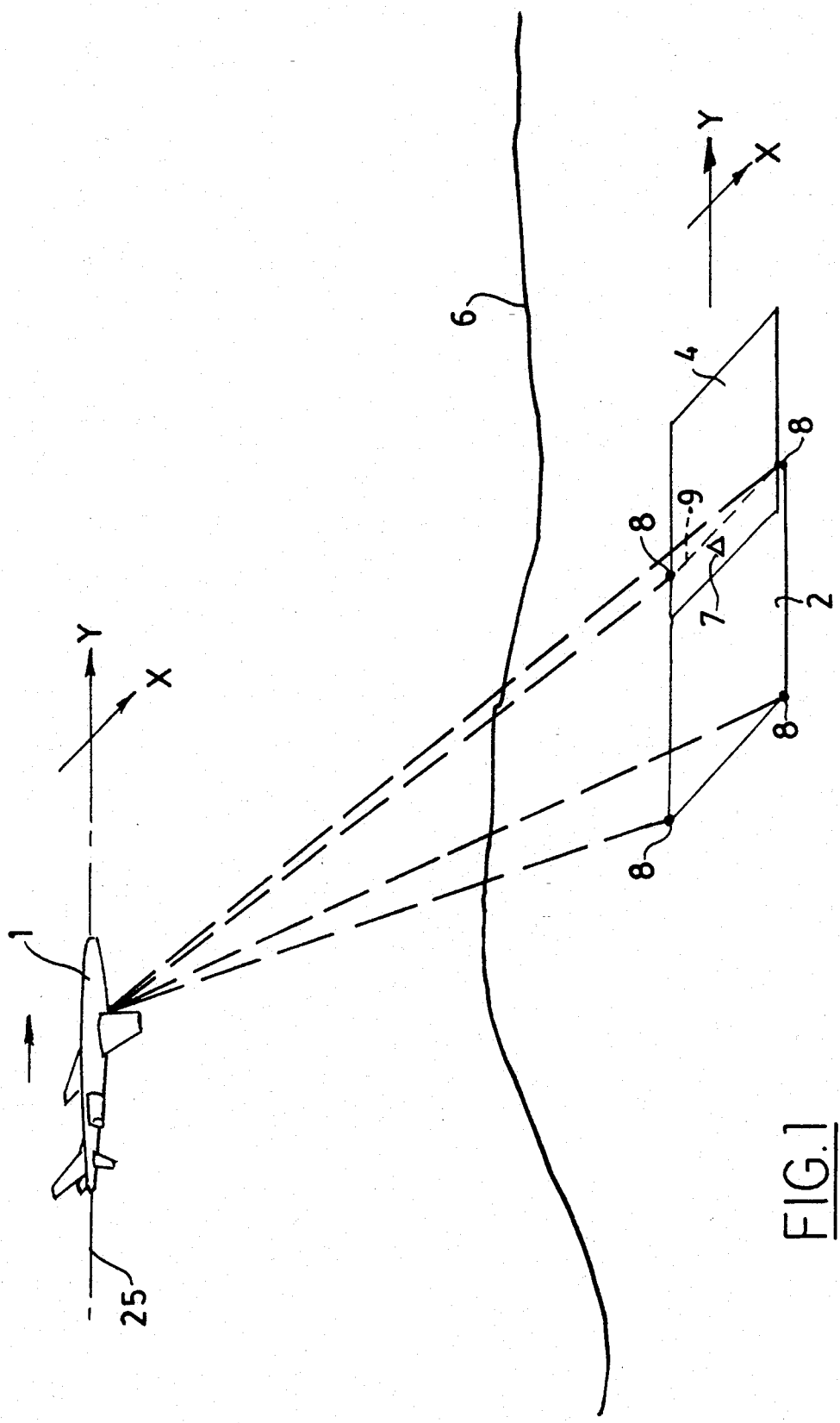
FIG. 1 is a view of a vehicle to which the apparatus of the present invention is attached while creating a map.

Referring more particularly to the drawings, FIG. 1 shows a moving vehicle, which can either be manned or unmanned, carrying the apparatus of the present invention and its orientation with portions of the land to be mapped. In the preferred embodiment, vehicle 1 must travel in a straight path.

When vehicle 1 reaches a pre-determined location and video camera 10 has within its view a pre-determined first portion 2 of land, a first image is created of that first portion. This first portion of land can be located directly beneath vehicle 1 such that the angle formed by the lens 11 and the first portion is orthogonal, or it can be located such that the angle is oblique. Video camera 10 creates an analog or digital video signal of the first image. In the preferred embodiment, video camera 10 is a video CCD Camera. An ordinary video camera may also be used, provided an analog to digital conversion card is in place in the computer 16 to convert the analog video signal to a digital representation.

The image of the first portion of land includes the four corners 8. A precalculated digital image template electronically overlaid on the first image contains crosshairs to be matched with registration marks on the land depicted. Corner coordinates, in latitude and longitude, of the four corners of first portion 2 can either be determined in advance or after the first image is captured in post production. In either case, the coordinates of the first portion can be determined by traditional surveying techniques or by comparison of the created first image with pre-existing tax maps.

The digitized first image is sent to computer 16, where it is processed by an adapted, commercially available "registration" program such as "Meridian," by MacDonald Detwiler, Vancouver, B.C., which program can match and register subsequent images containing the same stationary object and/or cross-hairs. Other software, such as ERDAS, can also be adapted for this purpose. The processed image with calculated geographic coordinates is then written to memory 14, which is preferably an optical disc unit, but can be a magnetic hard disc, magneto-optic drive or other storage device. Prior to processing by the registration and matching software, a digital code depicting a stationary object 7 on the ground is selected on the basis of its uniqueness from the leading edge 9 of the first image. This code will hereinafter be referred to as a discrete image element (DIE). The corner coordinates of the first image can also be written in memory 14 via a manual information input device, such as a keyboard 18. In the regular operation of this invention, that is, when the coordinates of subsequent portions are calculated, the data word containing the calculated coordinates is automatically written into video image lines if analog, or image file format if digital, prior to storage in memory 14. By imbedding a data word representing coordinates into the video image lines, the images are said to be coordinated.

Figure 4:
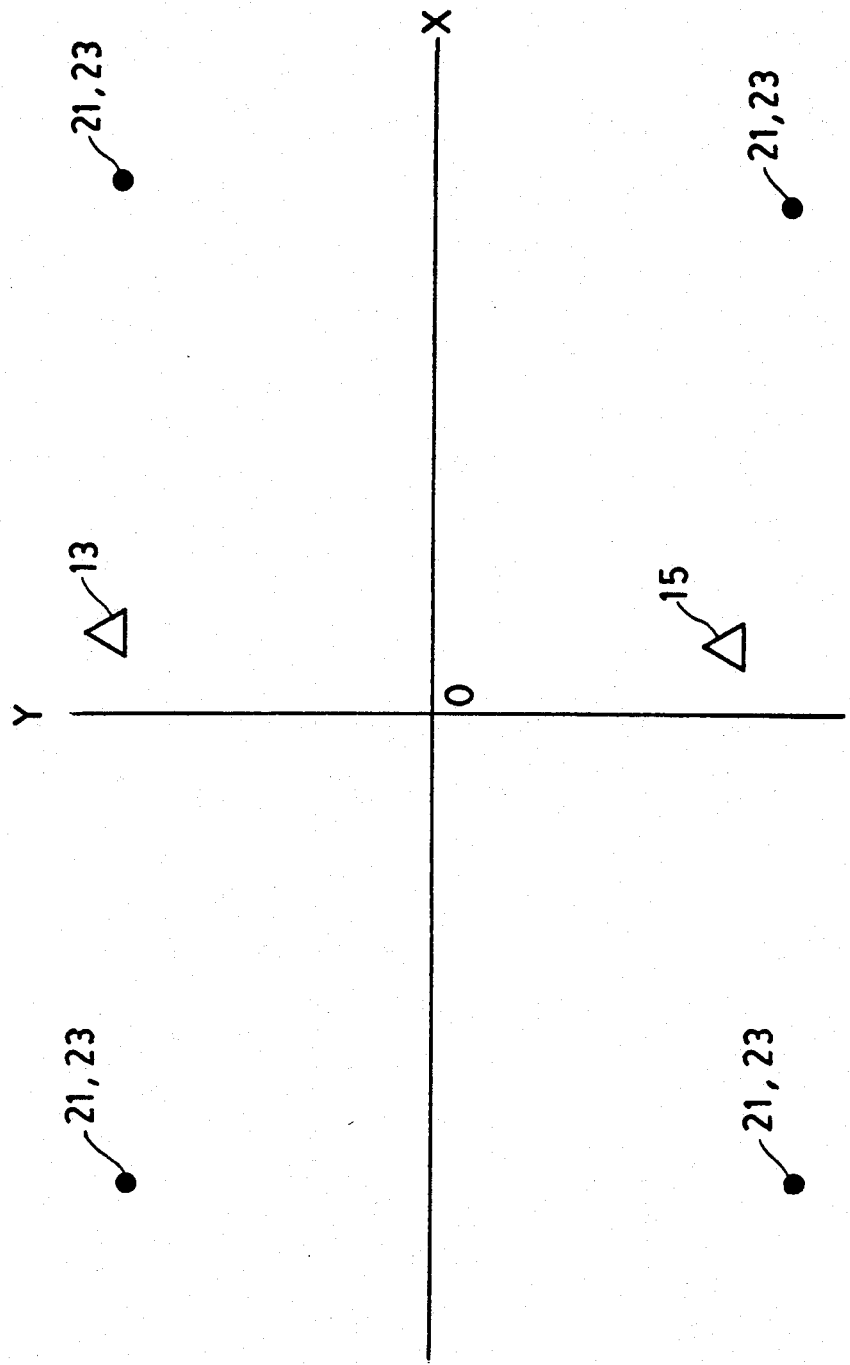
FIG. 4 depicts a first and second image superimposed on an X-Y coordinate system and the changed locations of a selected stationary object in each image.

A second video image of a second portion of land, which overlaps the first image, is also created. In the overlapping region, the first and second images have two sides in common. The second image is created while object 7 is within the field of view of camera 10, and therefore, in the overlapping region of the first and second images. Video camera 10 captures the second video image and sends it to computer 16, where it is digitized, formatted, coordinated and then stored in memory 14, as described above. The computer 16 calculates the distance between the changed locations of the DIE in the first and subsequent images in the set of images containing the DIE. This is accomplished by computing the distance between the two locations (13 and 15 in FIG. 4) of the DIE relative to the first image's corners 21 and the second image's corners 23 in an X-Y plane, with the Y axis being the path of travel of vehicle 1.

To determine the distance between the two locations of the DIE, the scale of the first and second and subsequent images with respect to the area depicted by those images is determined. Scale is determined by the following relations:

$$S = \frac{f/\cos T - Y'_{i,j}\sin T}{H - h}$$

$$Y'_{i,j} = X_{i,j}\sin\theta + Y_{i,j}\cos\theta + f\tan T$$

$$X_{i,j} = iP_x$$

$$Y_{i,j} = jP_y$$

where
S is scale factor,
$\theta$ is the angle formed by the longitudinal axis 25 of vehicle 1 and its path of travel, also known as the angle of rotation,
f is the focal length of lens 11,
T is the angle of the camera 10 and lens 11 with respect to the plane in which vehicle 1 travels, also known as tilt angle.
$Y'_{i,j}$ is the pixel location in an image rotated about an axis orthogonal to an X-Y plane,
$P_x$ is the distance from center to center of pixels on the X axis,
$P_y$ is the distance from center to center of pixels on the Y axis,
H is altitude above the land (datum) of vehicle 1 under camera center, which can be obtained from a laser altimeter or by subtracting known topographical data from a barometric altimeter read out,
h is altitude above datum of a point on a portion of land in an image, which can be obtained in the same manner as H, and
i is the number of pixels in the X direction, and
j is the number of pixels in the Y direction.

Figure 3:
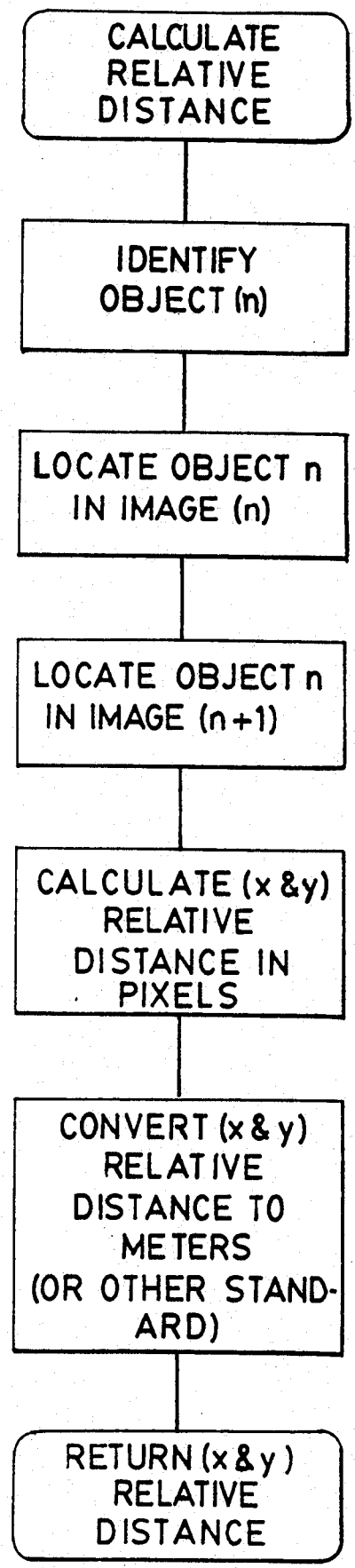
FIG. 3 is a flowchart depicting the program for determining the distance between the stationary object with respect to corner coordinates of the first image and with respect to corner coordinates of the second image.
Figure 6:
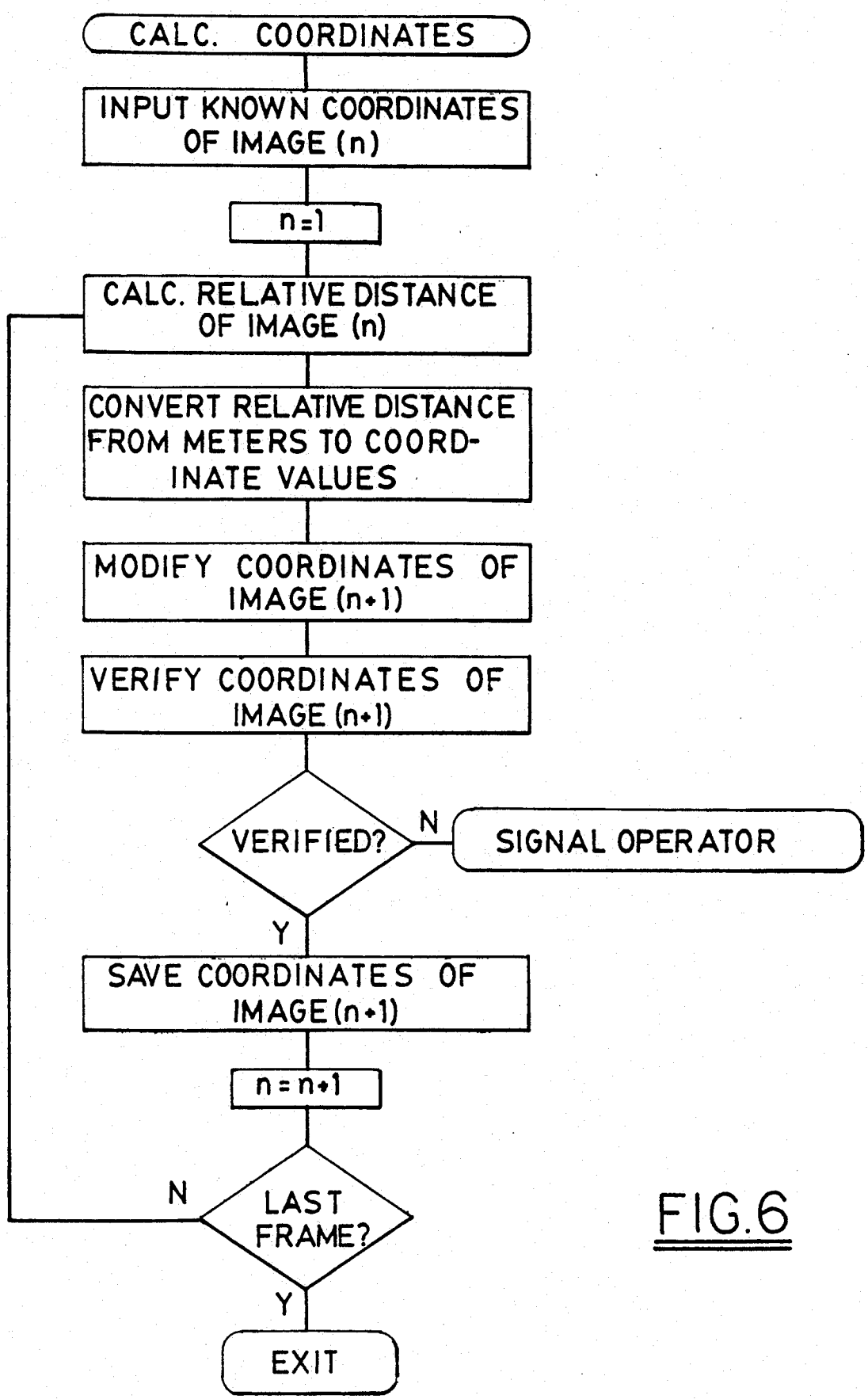
FIG. 6 is a flowchart of the algorithm used to adjust corner coordinates of the first image to arrive at corner coordinates of the second image.

Once scale is determined, computer 16 can determine the distance in feet or meters between the appearances of the DIE reflected in the unique chromanance and/or luminance code in the set of images in which it is contained, such as images 1 and 2. This process can be referred to as "picotmetric reckoning." The algorithm for this process is shown in FIG. 3. First, the DIE is identified and located in each image. Next, the relative distance is calculated in pixels. Using scale, the relative distance in pixels is converted to meters, or any other desired standard. When this distance has been determined, and assuming that vehicle 1 has travelled in a straight path, the four coordinates corresponding to the corners of image 2 can be determined by computer 16 by adjusting the latitude and longitude of the corners by an amount proportional to this distance in the direction of travel of vehicle 1. This distance and the bearing of vehicle 1 are used along with data contained in zone tables stored in memory 14 to compute new coordinates. The algorithm for this process is shown in FIG. 6. When these new corner coordinates have been determined, computer 16 writes a data word representing the new coordinates within the image and then stores the image in memory 14. A suitable method for imbedding data into video lines is discussed in U.S. Pat. No. 4,814,896, issued Mar. 22, 1989 to Heitzman, et al., incorporated herein by reference.

Figure 2:
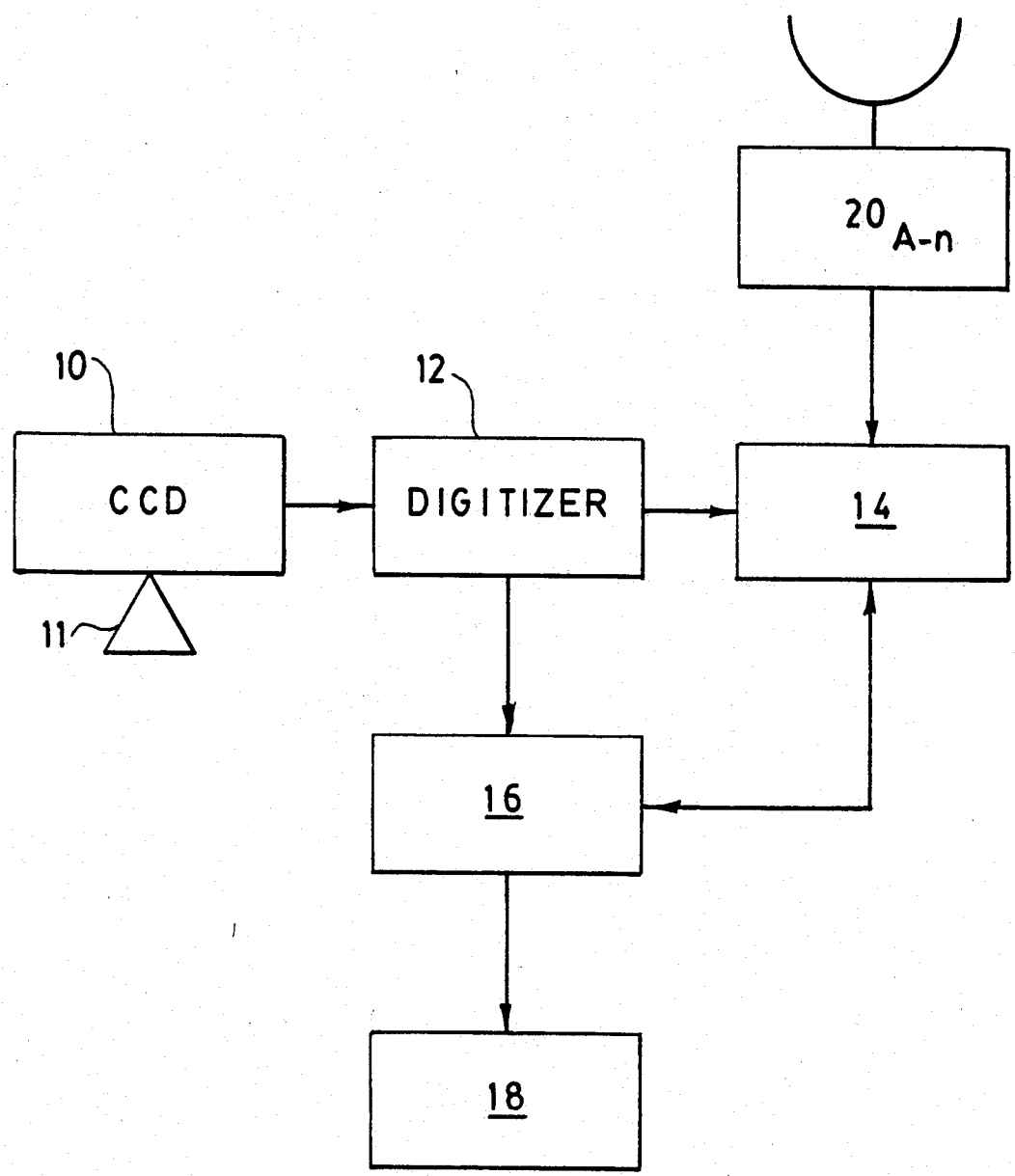
FIG. 2 is a block diagram of the apparatus of the present invention.

To protect accumulated data from inaccuracy because of deviations of vehicle 1 from a straight path, the mapping apparatus of the present invention has coordinate verification capability. This capability is implemented by a rack of receivers $20_{A-n}$ (FIG. 2) capable of receiving external geographic signals from such sources as a global positioning satellite network, LORAN, radio navigation signals, radar, microwave, cellular phone signals, laser altimeter, dead reckoning devices, range finders, gyroscopes, pitch, roll, crab and yaw indication devices, barometric altimeters, speedometers, odometers, and auto focus and/or auto iris devices. Suitable receivers are available from Autohelm, B&G "Network" and Signet.

Figure 5:
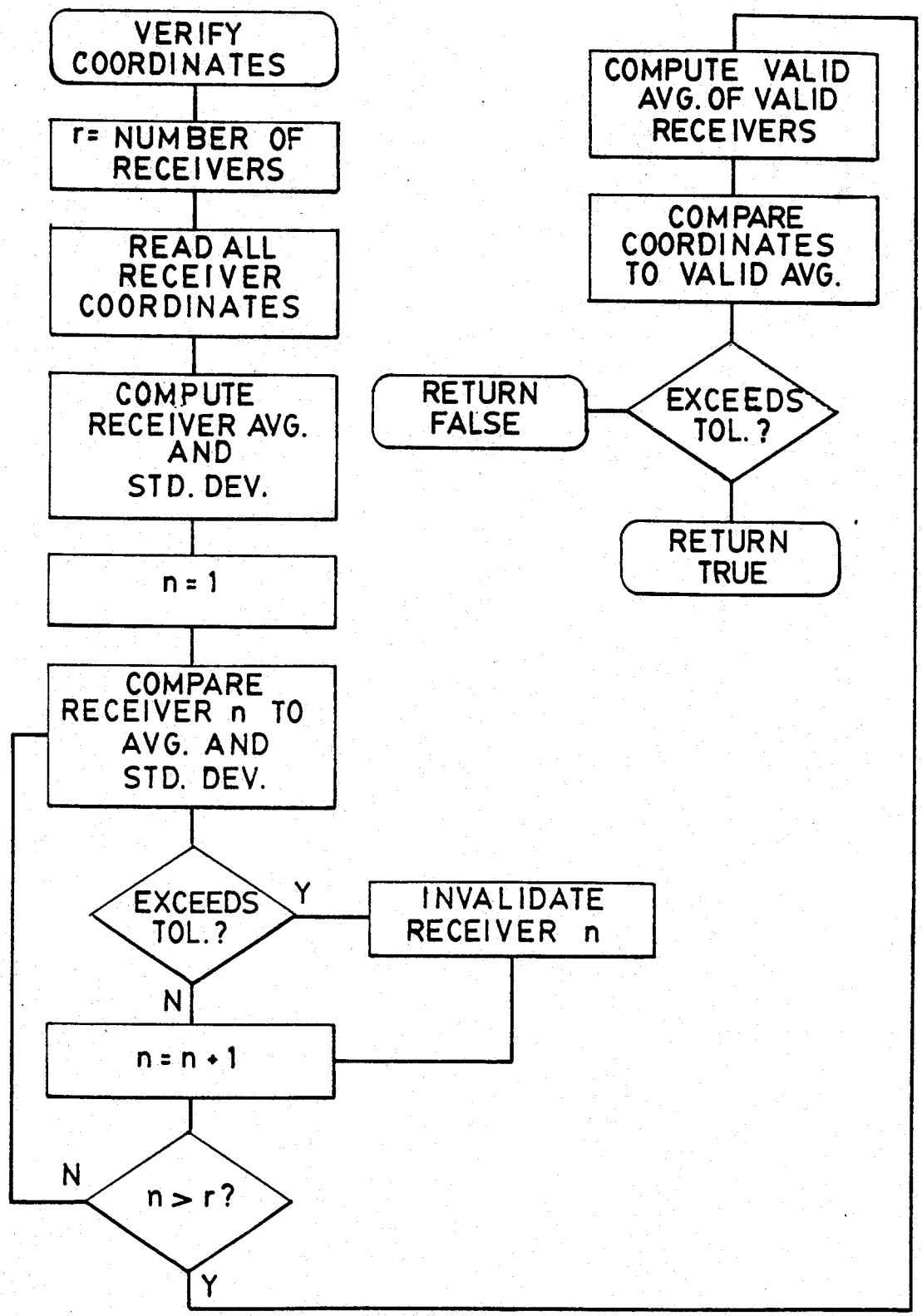
FIG. 5 is a flowchart depicting the algorithm used to compare calculated coordinates with geographic coordinates received from external sources.

To determine whether the vehicle 1 has deviated from its straight path, the calculated coordinates for a particular image are compared to geographic signals received from the external geographic signal sources for the same interval. A routine in computer 16, and shown in FIG. 5, compares the calculated coordinates to the position indication signals received by receivers $20_{A-n}$. If the two values differ by a predetermined amount, and a comparison of all other received signals are consistent with the deviation pursuant to the following method for polling and averaging which excludes radical departures, a warning signal will notify the operator of the vehicle that the craft has deviated from its intended path. In that case, the production of images of the strip of land must recommence. The algorithm for polling instruments and excluding radical departures is shown below and in FIG. 5:

Compute $\Sigma X_1$
Compute SD $\Sigma X_1$
Drop any $\sigma x > \pm 2SD$ from $\Sigma X_1$
Compute $\Sigma X_2$
Where $\Sigma X_1$ is the first average of instrument readouts;
SD is standard deviation;
$\sigma x$ refers to read out from any single instrument; and
$\Sigma X_2$ is adjusted average with extremes excluded.

The above steps for calculating (or pictometrically reckoning) coordinates for the image can in turn be repeated by locating within the second four corners of a second image another DIE at the leading edge of that image, tracking that DIE in a third image and calculating the change of corner coordinates from image two to image three, and assigning them to the third image. In this way, a complete map with accurately determined corner coordinates of constituent images can be created and stored in memory in real time. Each image can be retrieved from memory at random, and used to compile a map of the surveyed strip of land. This method obviates the need for manual assignment of geographic coordinates to the images before compiling.

In a similar fashion, land depicted by the several images can be measured within the image. The formula for scale described above is instrumental in such measurement. When scale is known, the size of any sub-portion of land can be calculated by computer 16 simply by identifying the geographic coordinates of the corners of the sub-portion to be measured.

Figure 7:
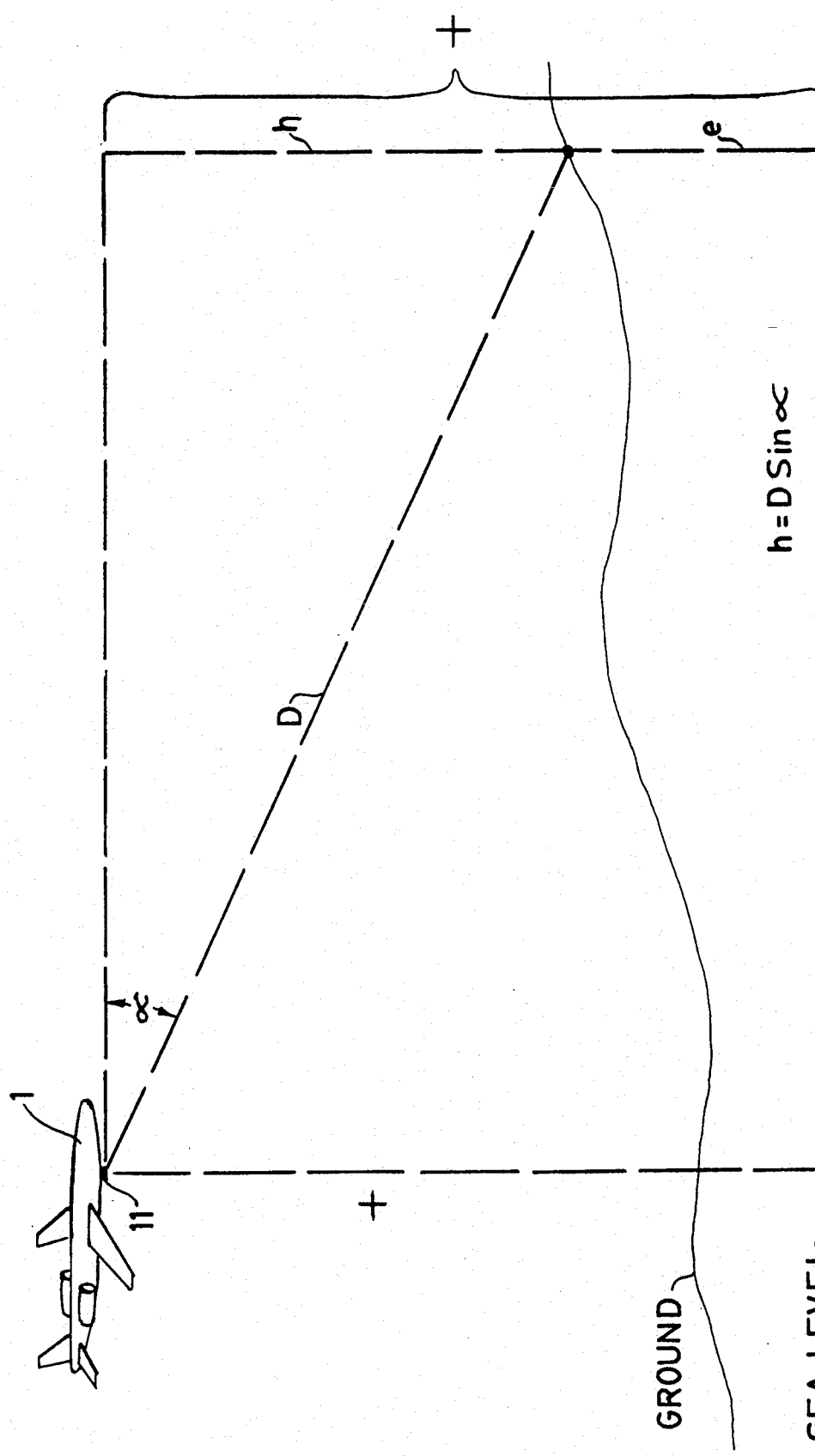
FIG. 7 is a diagram showing the trigonometric method for determining the elevation of a target portion of land.

The apparatus of the present invention is also capable of determining the elevation of a point on any portion of the strip of land and imbedding a data word representing the elevation in the digital image representing that portion. To accomplish this, readings are taken from an onboard rangefinder, which measures the distance between vehicle 1 and a point on the portion of land to be imaged, an onboard barometric altimeter and an onboard laser altimeter. The elevation, e, of a point on a portion can be determined as follows:

$$e = t - h$$

where
t is the barometric altitude over the portion of land (datum) being imaged, and
h is the height over target (datum) determined trigonometrically, as shown in FIG. 7 ($h = D \sin \alpha$, where D is the distance between vehicle 1 and the target and $\alpha$ is the angle formed by lens 11 and the plane in which vehicle 1 travels).

From the foregoing description it will be apparent that there has been provided an improved mapping and land measurement apparatus and method. While the invention has been described in detail with particular reference to preferred embodiments thereof, it will be understood that variations and modifications can be effected within the spirit and scope of the invention. Accordingly the foregoing description should be taken as illustrative and not in a limiting sense.

I claim:

1. A method of mapping land comprising:
   capturing a plurality of overlapping video images depicting overlapping portions of a continuous strip of land, said images having four corners,
   calculating geographic coordinates of said four corners,
   storing said images and coordinates real time in a random access storage medium,
   retrieving said images and coordinates from said storage medium, and
   compiling said images and coordinates to form a map which depicts said strip and identifies standard longitudinal and latitudinal coordinates of said strip.

2. A method of mapping and measuring land comprising:
   capturing a first digital image of a first portion of said land, said first digital image having four corners corresponding to the four corners of said first portion,
   identifying within said first digital image a digital representation of a stationary object on said first portion, said digital representation having a first position relative to four corners of said first digital image,
   determining coordinates of the four corners of said first digital image,
   capturing a second digital image of a second portion of said land, said second image overlapping said first image and including said digital representation of said stationary object, said second image having four corners corresponding to the four corners of said second portion,
   locating in said second digital image said digital representation, said digital representation having a second position relative to the four corners of said second digital image,
   calculating a distance between said first and second relative positions when the four corners of said first and second digital images are matched,
   calculating coordinates of the four corners of said second digital image by modifying said coordinates of the four corners of said first digital image by an amount proportional to said distance and in a direction parallel with a line between said first and second relative positions when the four corners of said first and second digital images are matched,
   storing in real time in said first digital image the coordinates of the four corners of said first digital image to form a first coordinated image, and storing said first coordinated image in computer memory, and storing in real time in said second digital image the coordinates of the four corners of said second digital image to form a second coordinated image and storing said second coordinates image in said computer memory, retrieving said first and second coordinated images from said computer memory, and compiling said first and second coordinated images and coordinates to form a map which depicts a strip and identifies standard coordinates of said strip, said first and second coordinates providing information from which a distance between points on said map can be determined to facilitate measurement of said land.

3. The method according to claim 2 further comprising:

determining an elevation of a point on said land by measuring the distance between a vehicle and said point, measuring the altitude above sea level of said vehicle and trigonometrically calculating said elevation using said distance and said altitude, and storing said elevation in an image depicting a portion of land on which said point lies.

4. The method according to claim 2 wherein said first digital image has a leading edge and wherein said identifying within said first digital image comprises choosing from said leading edge a pattern of pixels representing chrominance and luminance levels unique within said leading edge.

5. The method according to claim 4 wherein said storing in real time in said first and second digital images comprises creating a first data word representing the coordinates of said first digital image and a second data word representing the coordinates of said second digital image, and storing said first data word in a location representing one horizontal video line of said first digital image and storing said second data word in a location representing one horizontal video line of said second digital image such that said first and second data words become an integral part of the first and second digital images, respectively.

6. The method according to claim 5 wherein said first and second digital images depict said first and second portions, respectively, as viewed from an oblique angle.

7. An apparatus for mapping and measuring a strip of land comprising:

means for capturing a first digital image of a first portion of said land and a second digital image of a second portion of said land, said first digital image overlapping said second digital image to form an overlap, said first and second portions having four corners, said first and second digital images having four corners corresponding to the four corners of said first and second portions, respectively, and said first digital image having a leading edge, means for determining coordinates of said four corners of said first portion, means for identifying within said first digital image a digital representation of a stationary object in said overlap, said digital representation having a first position relative to the corners of said first digital image, means for locating within said second digital image said digital representation, said digital representation having a second position relative to the four corners of said second digital image, means for determining a distance between said first relative position and said second relative position in an X-Y coordinate system in which the four corners of said first and second digital images are aligned, said determining means having means for measuring said first and second portions and for measuring any sub-portion of said first and second portions, means for calculating coordinates of the four corners of said second portion by modifying the coordinates of said first portion by an amount proportional to said distance and in a direction parallel with a line between said first and second relative positions in said X-Y coordinate system, means for capturing a first data word representing said first position and the coordinates of said four corners of said first portion, and a second data word representing said second position and the coordinates of said four corners of said second portion, and memory means for storing said first image and said first data word in a first common memory location and for storing said second image and said second data word in a second common memory location.

8. The apparatus according to claim 7 wherein said means for capturing a digital image comprises a charge coupling device, said charge coupling device having means for generating digital images of chrominance and luminance levels of objects on the ground.

9. The apparatus according to claim 7 further comprising means for determining elevation of a point on said first and second portions and for storing said elevation in said first and second common memory locations, respectively.

10. The apparatus according to claim 7 wherein said first and second digital images depict said first and second portions, respectively, as viewed from an oblique angle.

11. The apparatus according to claim 10 further comprising means for receiving at least one externally generated geographic information signal, and means for comparing said externally generated geographic information signal to said calculated coordinates and generating a warning signal if said externally generated geographic information signal and said calculated coordinates differ by a predetermined amount.

12. The apparatus according to claim 11 wherein said externally generated geographic signal comprises a signal generated by a global positioning satellite.

13. The apparatus according to claim 11 wherein said externally generated geographic signal comprises a signal generated by LORAN.

14. The apparatus according to claim 11 wherein said externally generated geographic signal comprises a signal generated by a radio navigational system.

15. The apparatus according to claim 11 wherein said externally generated geographic signal comprises a signal generated by a laser altimeter.

16. An apparatus for mapping land comprising:

means for capturing a plurality of overlapping video images depicting overlapping portions of a continuous strip of land, said images having four corners, means for calculating geographic coordinates of said four corners, means for storing said images and coordinates, means for retrieving said images and coordinates from said means for storing, and means for compiling said images and coordinates to form a map which depicts said strip and identifies standard longitudinal and latitudinal coordinates of said strip.

* * * * *